(12) United States Patent
Boehm et al.

(10) Patent No.: US 10,300,657 B2
(45) Date of Patent: May 28, 2019

(54) CORROSION INHIBITING SPRAYABLE THERMOPLASTIC COVER FOR MECHANICAL ASSEMBLIES, AND METHODS OF MAKING AND USING

(71) Applicants: Kenneth Lee Boehm, Indianapolis, IN (US); Ivan Hess, Pendleton, IN (US)

(72) Inventors: Kenneth Lee Boehm, Indianapolis, IN (US); Ivan Hess, Pendleton, IN (US)

(*) Notice: Subject to any disclaimer, the term of this patent is extended or adjusted under 35 U.S.C. 154(b) by 115 days.

(21) Appl. No.: 15/485,452

(22) Filed: Apr. 12, 2017

(65) Prior Publication Data

US 2017/0291351 A1    Oct. 12, 2017

Related U.S. Application Data

(60) Provisional application No. 62/321,341, filed on Apr. 12, 2016.

(51) Int. Cl.
*F16C 33/72* (2006.01)
*B29C 63/22* (2006.01)
*B29C 41/08* (2006.01)
*B29C 41/44* (2006.01)
*B29C 63/00* (2006.01)
*B29K 101/12* (2006.01)
*B29L 31/04* (2006.01)

(52) U.S. Cl.
CPC .............. *B29C 63/22* (2013.01); *B29C 41/08* (2013.01); *B29C 41/44* (2013.01); *B29C 63/0017* (2013.01); *B29C 63/0065* (2013.01); *B29K 2101/12* (2013.01); *B29L 2031/04* (2013.01); *F16C 33/72* (2013.01); *Y10T 428/24008* (2015.01)

(58) Field of Classification Search
CPC ........... Y10T 428/23; Y10T 428/24008; B29C 63/22; B29C 63/0017; B29C 63/0065; F16C 33/72; F16D 3/843; F16D 3/84
See application file for complete search history.

(56) References Cited

U.S. PATENT DOCUMENTS

2008/0172768 A1* 7/2008 DeStefano ........... A41B 13/106
2/49.2

* cited by examiner

*Primary Examiner* — Alexander S Thomas
(74) *Attorney, Agent, or Firm* — Carla Gannon Law

(57) ABSTRACT

A Corrosion Inhibiting Sprayable Thermoplastic ("CIST") cover is formed by spraying melted CIST onto a mold, allowing the CIST to cure, removing the cured cover from the mold using a series of cuts if necessary, positioning the cover on a mechanical assembly whose shape is significantly identical to the mold, and fusing the cuts on the cover using heat to reform the cover on the mechanical assembly.

7 Claims, 4 Drawing Sheets

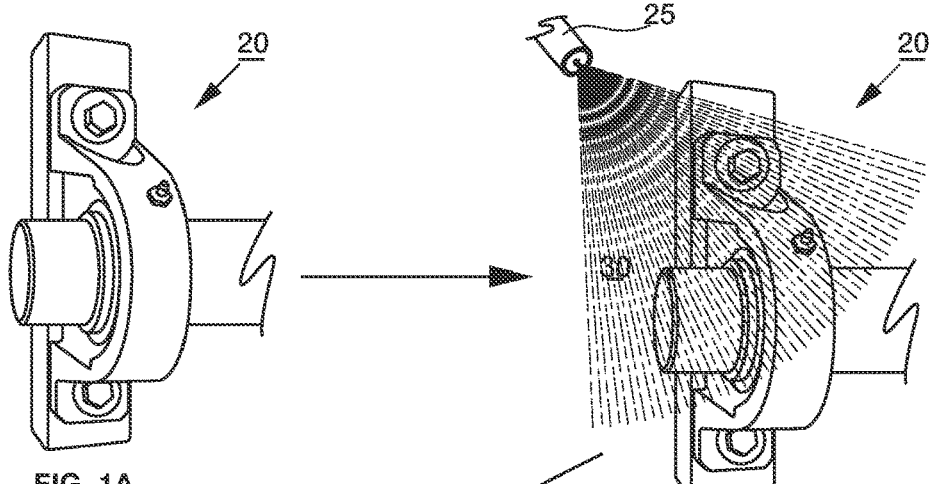
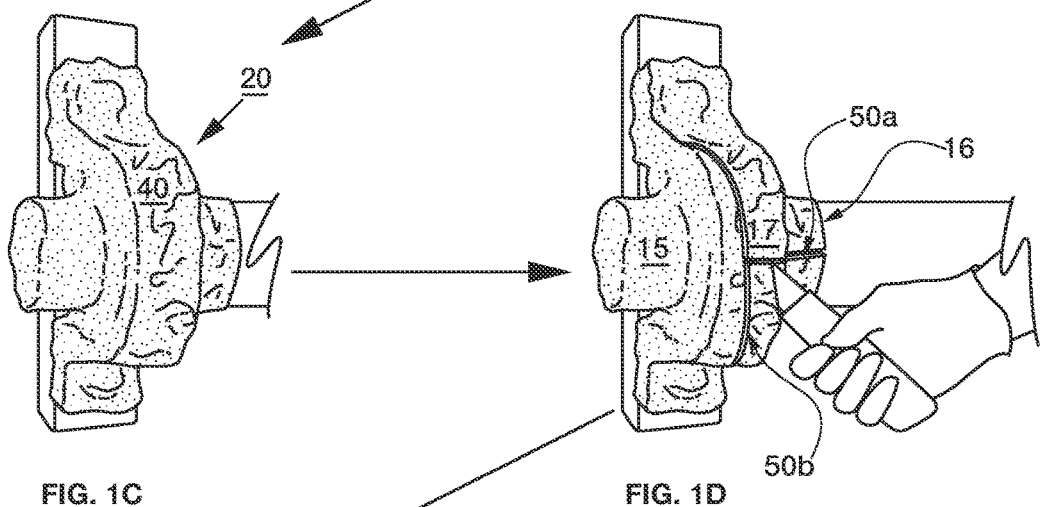
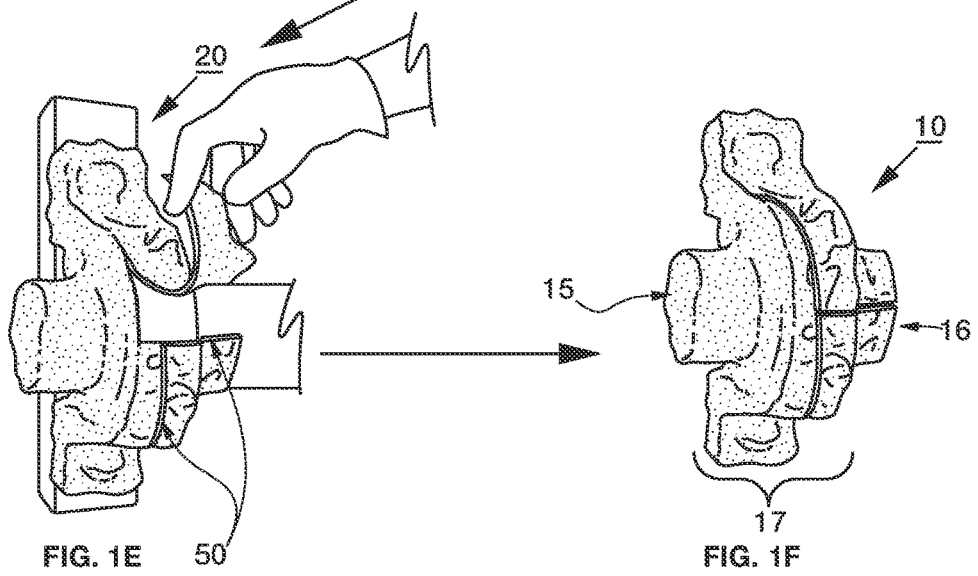

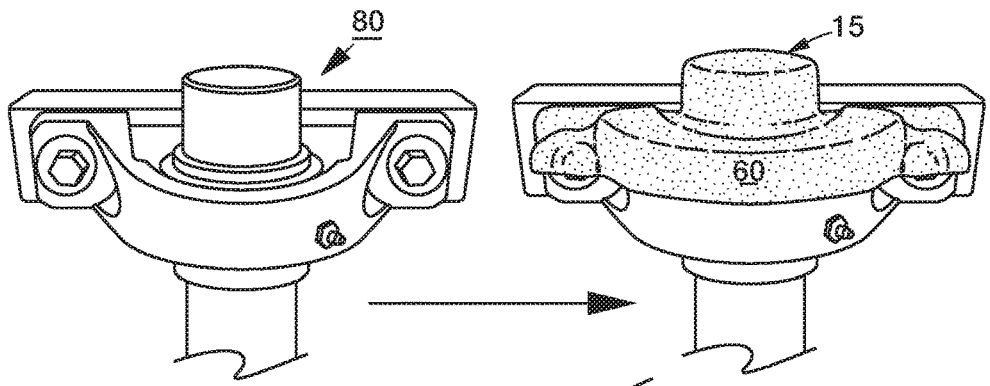
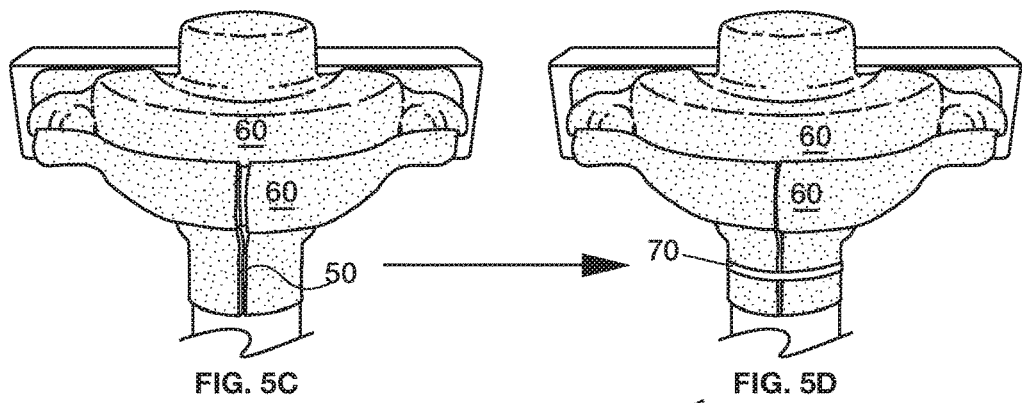
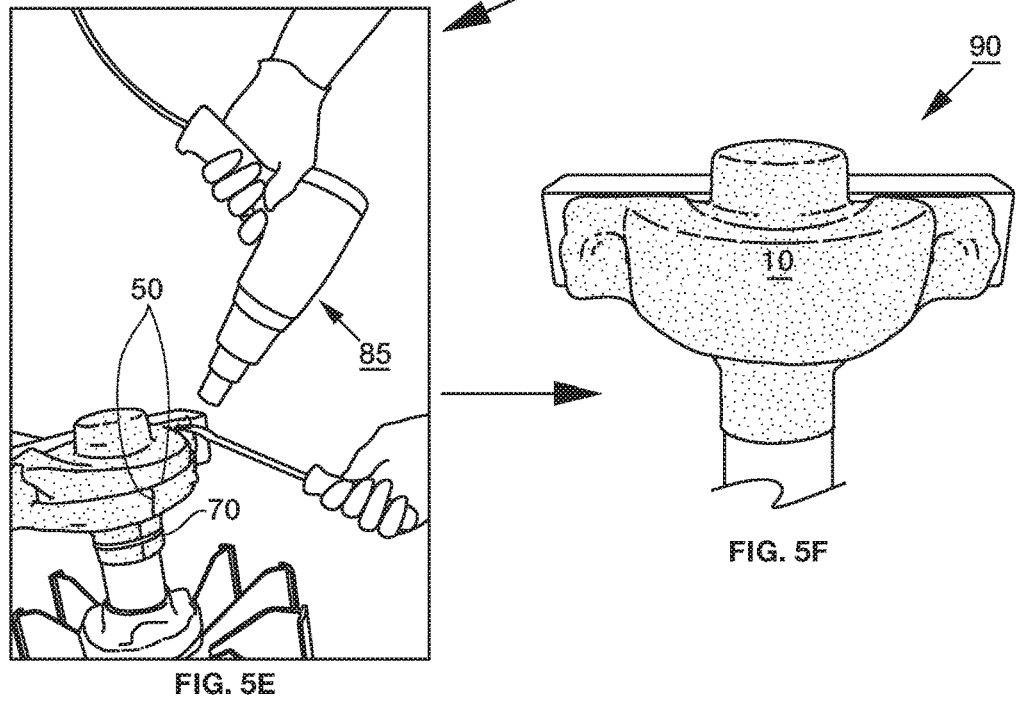

1

CORROSION INHIBITING SPRAYABLE THERMOPLASTIC COVER FOR MECHANICAL ASSEMBLIES, AND METHODS OF MAKING AND USING

RELATED APPLICATIONS

This application claims the benefit of U.S. Provisional Patent Application 62/321,341 entitled PROTECTIVE THERMOPLASTIC COVER FOR BEARING ASSEMBLIES, AND METHOD OF MAKING, invented by Boehm et al., and filed Apr. 12, 2016.

BACKGROUND OF THE INVENTION

The present invention relates to protective covers for mechanical assemblies, and more specifically, to a corrosion inhibiting sprayable thermoplastic cover for bearing assemblies, and the method of making and using this cover.

Industrial operations such as manufacturing lines often come to a screeching halt when mechanisms in the infrastructure malfunction or stop working. These failures are costly, potentially dangerous, and frustrating. Mechanical problems in an industrial operation are particularly troublesome insofar as it isn't usually possible to "swap out" a bad part, so repairs often require shutting down the entire operation.

Corrosion and contamination are leading causes of premature failure in rotating systems such as bearing assemblies. In an effort to prevent these issues, Corrosion Inhibiting Sprayable Thermoplastics ("CISTs") are used in the industry to protect both stored and operational bearing assemblies.

The conventional delivery method for CISTs is mobilizing spraying equipment and applying the CIST product directly onto the bearing assembly as a hot liquid. Said another way, the spraying equipment is brought to the bearing assembly, and the CIST is applied in situ. This is considered the best procedure because it isn't practical to remove bearing assemblies from industrial operations, treat them, and return them to the underlying structure.

An exemplary device and method of applying CIST in situ is set forth in U.S. Pat. No. 9,211,562 entitled DEVICE AND METHOD FOR MELTING AND SPRAYING THERMOPLASTICS to Boehm et al., which issued on Dec. 15, 2015, and is hereby incorporated in its entirety.

Once the liquefied CIST is cool, it becomes a flexible solid covering over the bearing, creating a barrier to corrosion and contamination entry. The CIST does not bond to the bearing housing or shaft surface, thereby allowing both to function freely underneath the coating. This method is very effective, and the life of protected equipment is increased exponentially. Unfortunately, however, this system has shortcomings.

One problem of applying CIST via mobilized spraying is that installed bearing assemblies are often difficult to access with the application equipment due to length of spray hose, size of application equipment, and/or limited access to surfaces with the spray gun. Another issue is the cost of application equipment. Yet another shortcoming is the significant time that is necessary for application equipment to melt the CIST, which adds to equipment downtime.

As can be seen, there is a need for a protective CIST cover for bearing assemblies that doesn't require mobilized spraying equipment in situ. It is desirable that this cover can be fit onto bearing assemblies that are hard to access. It is also desirable that this cover is relatively inexpensive, easy to use, and easy to transport. It is also desirable that the cover can be fixed relatively quickly, and with standard tools and equipment.

BRIEF DESCRIPTION OF THE DRAWINGS

FIG. 1 depicts steps in producing a CIST cover with:
FIG. 1A depicting a bearing assembly to be used as a mold;
FIG. 1B depicting melted CIST being sprayed on the mold;
FIG. 1C depicting the mold covered with CIST;
FIG. 1D depicting cured CIST being cut for removal from the mold;
FIG. 1E depicting cured CIST being removed from the mold;
and
FIG. 1F depicting a cover;
FIG. 5 depicts steps in covering an assembly with:
FIG. 5A depicting an uncovered assembly;
FIG. 5B depicting the assembly with one partial section of a cover in place;
FIG. 5C depicting the assembly with two partial sections of the cover in place;
FIG. 5D depicting the assembly with the two partial sections secured with a mechanical tie;
FIG. 5E depicting heating the cover;
and
FIG. 5F depicting a covered assembly.

DETAILED DESCRIPTION OF THE INVENTION

Figure 2:
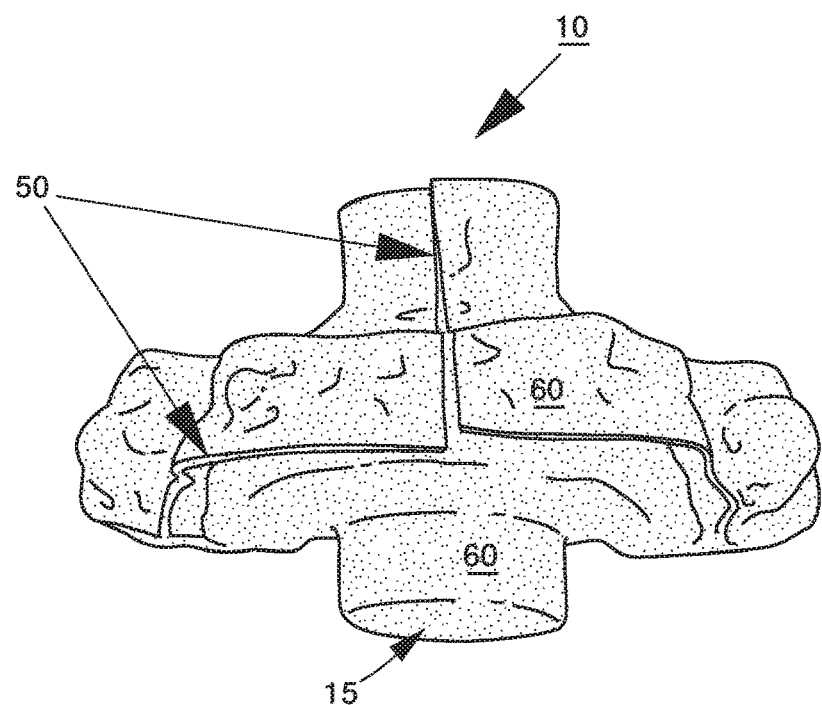
FIG. 2 depicts a cover with the opened end oriented upward, and the closed end oriented downward.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The following structure numbers shall apply to the following structures among the various FIGS.:
10—Cover;
15—Closed end;
16—Opened end;
17—Body;
20—Mold;
25—Sprayer
30—Melted CIST;
40—Cured CIST;
50—Cut;
50a—Longitudinal cut;
50b—Lateral cut;
60—Partial section;
70—Mechanical tie;
80—Uncovered assembly;
85—Heat source; and
90—Covered assembly.

Broadly, the present invention is a CIST cover that is formed by spraying melted CIST onto a mold, allowing the CIST to cure, removing the cured cover from the mold using a series of cuts if necessary, positioning the cover on a mechanical assembly such as a bearing assembly whose shape is significantly identical to the mold, and fusing the cuts on the cover using heat to reform the cover on the mechanical assembly.

Referring to the figures, FIG. 1 depicts critical steps involved in forming a cover. FIG. 1A depicts mold 20, which is in the shape of a bearing assembly. It should be understood that molds of other mechanisms with moving parts, for example gearboxes, are within the scope of the invention, and that bearing assemblies are used as an example.

FIG. 1B depicts sprayer 25 depositing melted CIST 30 onto mold 20. The preferred CIST is Enviropeel E170 from Enviropeel USA, of Indianapolis, Ind., although other similar CISTs and/or thermoplastics, especially having characteristics of a melting and hardening point of 130° C. to 180° C., and the ability to melt and harden multiple times, could also be employed. It is preferred that CIST 30 is deposited to form a layer approximately 4 to 10 mm thick, although it should be understood that variances are likely to occur due to accumulation in certain areas, operator differences, and so forth.

FIG. 1C depicts cured CIST 40 covering mold 20. In this step the CIST is allowed to fully cool and cure, which requires approximately 2 to 30 minutes. Fully cured CIST will be a flexible plastic material with an oily texture.

FIG. 1D depicts cutting cured CIST for subsequent removal from mold. It is desirable to introduce as few cuts 50 as necessary in order to remove cured CIST from mold, but without deforming the shape. Longitudinal cut 50a travels along axis of closed end 15 to opened end 17 while lateral cut 50b travels up and down along body 17.

FIG. 1F depicts removing cut and cured CIST from underlying mold 20. It is desirable that cured CIST be removed from mold without tearing or deforming.

Figure 3:
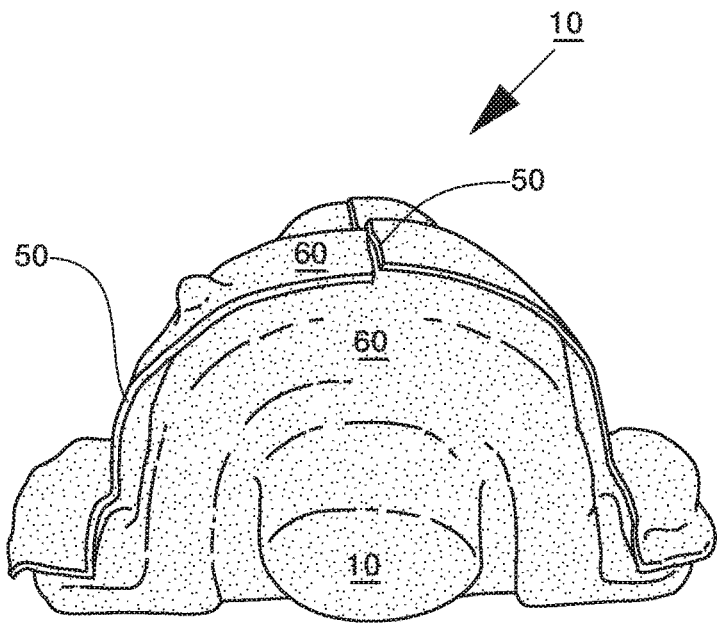
FIG. 3 depicts a cover in perspective with the closed end oriented towards the viewer.
Figure 4:
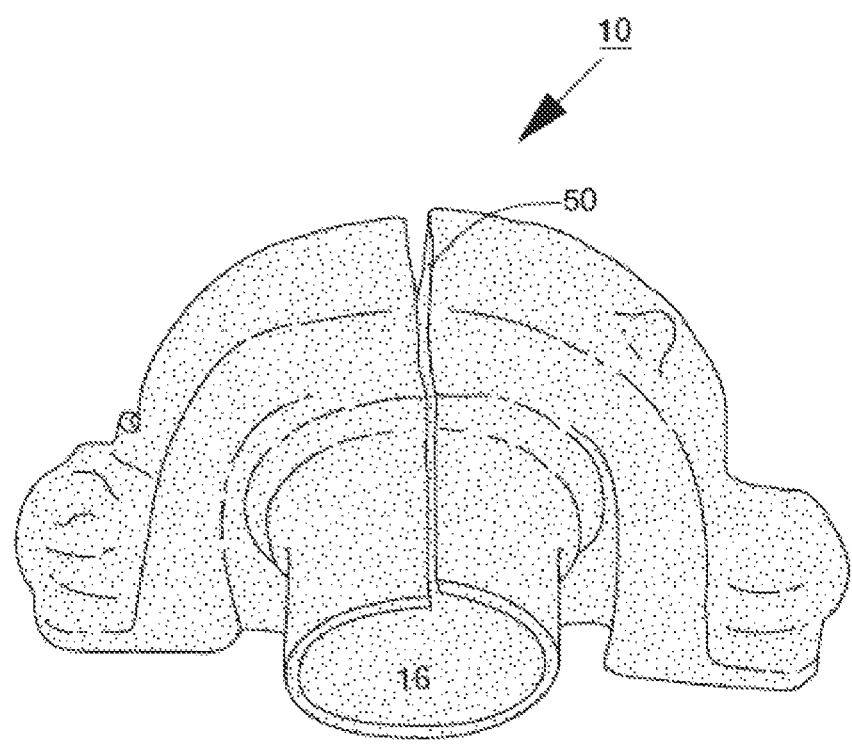
FIG. 4 depicts a cover in perspective with the opened end oriented towards the viewer.

FIGS. 2-5 depict various views of fully formed CIST cover 10. Two partial sections 60 are separated by previously introduced lateral cuts 50, with one partial section including closed end 15, and the other partial section including opened end 16.

Installation of cover 10 is depicted in FIG. 5, with FIG. 5A depicting uncovered assembly 80. The size and shape of uncovered assembly 80 must be substantially similar to mold 20 from which cover 10 is formed. As used herein, substantially similar shall mean approximately +/−10%.

FIG. 5B depicts placement of one partial section 60, this one including closed end 15. FIG. 5C depicts placement of the other partial section 60, this one including opened end 16 and longitudinal cut 50.

FIG. 5D depicts both partial sections 60 in place, and secured with mechanical tie 70. An example of a suitable mechanical tie is a standard zip tie. A mechanical tie may or may not be necessary, depending on the configuration of the cured CIST.

FIG. 5E depicts a technician using heat source 85 to affix partial sections 60 to underlying uncovered assembly 80, including fusing cuts 50. This is accomplished by applying heat adequate to melt CIST, typically 100 to 200° C., and preferably using a heat gun or flame torch as a heat source. Heating is required in areas where the sections meet and need to be fused together.

FIG. 5F depicts cover 10 in position, thereby forming covered assembly 90. A properly affixed cover preferably is in substantially consistent contact with underlying assembly. Said another way, there are minimal gaps preferably less than 2 mm, between the cover and the underlying mechanical assembly.

Specifications of certain structures and components of the present invention have been established in the process of developing and perfecting prototypes and working models. These specifications are set forth for purposes of describing an embodiment, and setting forth the best mode, but should not be construed as teaching the only possible embodiment. Modifications are within the scope of this invention. By way of example, it is possible to injection mold, pour mold, or vacuum form covers of the present invention, versus formation by spraying onto a mold. Ranges of values set forth inherently include those values, as well as all increments between. Also, it should be understood that all values are "approximately", and "approximately" and the like, unless otherwise stated or contrary to common sense, are +/−10%.

What is claimed is:

1. A protected mechanical assembly including:
   A. A bearing assembly; and
   B. A Corrosion Inhibiting Sprayable Thermoplastic cover surrounding said bearing assembly, said cover including a first partial section including a first end; a second partial section including an second end, said first partial section and said second partial section separated one from another by a shared lateral cut; and at least one longitudinal cut in one of said partial sections, wherein said cover is sized and shaped to conform to said bearing assembly.

2. The protected mechanical assembly of claim 1 wherein said Corrosion Inhibiting Sprayable Thermoplastic has a melting and hardening point of approximately 130° C. to 180° C.

3. The protected mechanical assembly of claim 2 wherein said Corrosion Inhibiting Sprayable Thermoplastic has ability to melt and harden multiple times.

4. The protected mechanical assembly of claim 1 wherein said first end is a closed end.

5. The protected mechanical assembly of claim 4 wherein said second end is an opened end.

6. The protected mechanical assembly of claim 1 wherein said at least one longitudinal cut is in said second partial section.

7. The protected mechanical assembly of claim 1 having a thickness of approximately 4 to 10 mm thick.

\* \* \* \* \*